Aug. 26, 1958 L. M. GERMAIN 2,849,625

MAGNETIC AMPLIFIER PULSE GENERATOR

Filed Oct. 9, 1956 2 Sheets-Sheet 1

INVENTOR.
LLOYD M. GERMAIN
BY *Eli Weiss*
ATTORNEY

Aug. 26, 1958 L. M. GERMAIN 2,849,625

MAGNETIC AMPLIFIER PULSE GENERATOR

Filed Oct. 9, 1956 2 Sheets-Sheet 2

INVENTOR.
LLOYD M. GERMAIN
BY Eli Weiss
ATTORNEY 2,849,625

MAGNETIC AMPLIFIER PULSE GENERATOR

Lloyd M. Germain, New York, N. Y., assignor to Control Instrument Company, Brooklyn, N. Y., a corporation of New York Application October 9, 1956, Serial No. 614,857

18 Claims. (Cl. 307—88)

This invention relates generally to a magnetic system and more particularly to a magnetic amplifier pulse generator.

Presently, a series of accurately positioned pulse signals are generated by feeding a reference pulse into a lumped parameter delay line of the inductance-capacitance type. The delay line contains a plurality of accurately positioned taps which sense the pulse as it travels down the delay line. Thus, as the input pulse signal travels down the line from one end to the other, it is sequentially detected by the plurality of taps and then fed to a reshaper where its wave form is improved and amplified for further utilization. The lumped parameter delay lines of the type mentioned above must be manufactured in accordance to rigid specifications resulting in a relatively expensive item. The reshapers and amplifiers usually utilize vacuum tubes, and the taps on the delay line must be positioned accurately to correct for additional delays introduced by the presence of the reshaper and the amplifier.

It is a primary object of this invention to provide a magnetic amplifier pulse generator.

It is an additional object of this invention to provide a pulse generator that is reliable in operation, and economical to produce.

It is another object of this invention to provide a pulse generator that generates accurately spaced pulses.

It is still another object of this invention to provide a pulse generator that can be utilized directly to drive a load.

It is still another object of this invention to provide a pulse generator that is not subject to failure as a result of vibration or shock.

Other objects and many of the attendant advantages of this invention will be readily appreciated as the apparatus becomes better understood by reference to the following detailed description when considered in connection with the accompanying drawings wherein.

Briefly, this invention comprises a plurality of cascaded magnetic amplifiers wherein the output signal from each of the even numbered magnetic amplifiers, except the last, is fed back to the first core as a negative feedback signal to inhibit the passage of a predetermined number of input signals. An input signal that is in synchronism with a reference frequency, and of the proper phase will generate sequentially appearing output signals at each core progressing from the first core to the last core in one-half cycle steps. The negative feedback signals prevent succeeding input pulses from entering the magnetic amplifier pulse generator by balancing out the input voltage and resetting the input core until the original input pulse has passed through the last magnetic amplifier.

Figure 1:
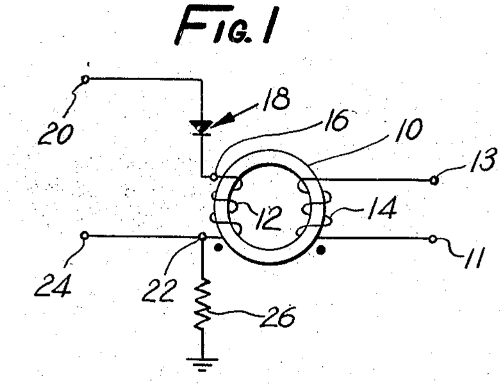
Figs. 1 and 2 are schematic representations of basic amplifiers of the magnetic type.

Referring to Fig. 1, the basic magnetic amplifier comprises a core 10 possessing preferably a rectangular shaped hysteresis loop. The core 10 supports a power or output winding 12 and a signal or input winding 14. One end 16 of the power winding 12 is coupled to the cathode of a crystal diode 18; the anode of the crystal diode 18 is coupled to an input terminal 20 to receive a plurality of alternately spaced positive and negative potential signals. The other end 22 of the power winding is coupled to a ground terminal through a resistor 26. An output terminal 24 is coupled to the junction of the power winding 12 and the resistor 26.

The hysteresis loop of the magnetic core utilized in this invention is substantially rectangular in shape and the magnetic cores can be made of ferrites or magnetic tapes.

The heat treatment of the cores can vary in accordance with the properties desired. In addition to the wide variety of materials available, the cores utilized can have any one of a number of different geometrical shapes or configurations, and the core can have a continuously closed or partially open magnetic path.

The present invention is not restricted to the utilization of any one specific material or core configuration, the ring type of cores illustrated are for ease of representation only. Nor is the present invention limited to the utilization of materials having hysteresis loops substantially rectangular in shape, this characteristic was chosen for illustration purposes only. Thus, neither the configuration nor the physical characteristics of the core shown are critical and any one of many configurations and physical characteristics known to those skilled in the art can be utilized.

In the drawings the dot representation is utilized to represent the direction of the coil windings by indicating like polarities of associated coils at any particular instant. Thus, referring to Fig. 1, the polarity of the end 22 of coil 12 will always be identical with the polarity of the lower end of coil 14.

Figure 3:
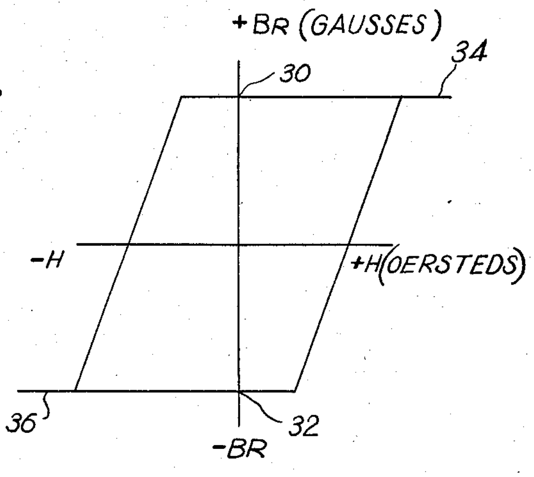
Fig. 3 is an idealized hysteresis loop of a magnetic material which can preferably be utilized in the cores of the magnetic amplifiers utilized in this invention.

Referring to Fig. 3 therein is shown a substantially rectangular hysteresis loop. In material having magnetic properties, the term remanence ($B_r$) applies to that value of induction that remains after the removal of a field that produces magnetic saturation. Therefore, the point indicated by the numeral 30 of Fig. 3 represents a point of positive remanence ($+B_r$); the point indicated by the numeral 32 represents a point of negative remanence ($-B_r$); the point indicated by the numeral 34 represents positive saturation; and the point indicated by the numeral 36 represents a point of negative saturation.

For purpose of illustration, it shall be assumed that a single coil of wire is wound around a magnetic core that has a substantially square hysteresis loop as shown in Fig. 1. If the core is magnetically saturated to the point 30 of Fig. 3 and current is passed through the coil of wire in a direction tending to increase the flux in the core in the same direction, the core will be driven from the point 30 to the point 34. During this state of operation there is relatively little flux change in the core and the coil presents a relatively low impedance. Thus, the energy fed to the coil 12 during this state will pass through the coil to be detected and utilized. However, if the core were at the negative condition represented by the numeral 32, prior to the application of the signal through the coil, the core would have been driven from the point 32 to the point 34. During the occurrence of the last mentioned cycle there would be a relatively large flux change in the core and, as such, the coil would present a relatively high impedance to the applied signal. Thus, if the input signal is of the proper magnitude and the core is at the point 32 of the curve of Fig. 3, then substantially all of the energy of the input signal will be expended in magnetically driving the core from the point 32 to the region represented by the point 34, and a negligible amount of the input energy will pass through the coil to the output terminal.

Therefore, the magnetic condition of the core at the time of the application of the input signal will determine whether an output signal will be present or absent. If the core is, magnetically, at the point indicated by the numeral 30, a relatively large output will be present. If, however, the core is, magnetically, at the point represented by the numeral 32, a relatively small and undetectable output signal will be present.

Figure 4:
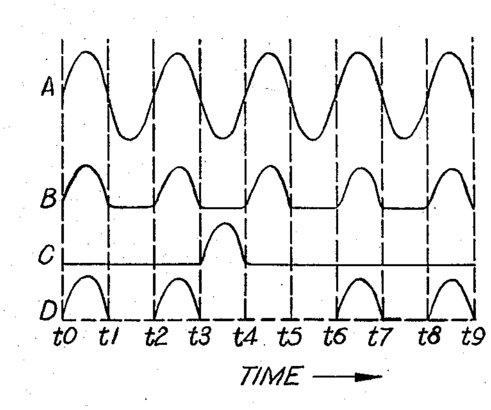
Fig. 4 illustrates wave forms that are present during the operation of the basic amplifier of the magnetic type as illustrated in Fig. 1.

Referring now to the basis magnetic amplifier shown in Fig. 1, and to the associated wave forms shown in Fig. 4, it shall be assumed for the purpose of this discussion, that the power pulses, curve A of Fig. 4, are sinusoidal in shape and vary in equal amplitudes of plus and minus X volts about the zero potential reference line. The power pulses are fed from the input terminal 20 to the crystal diode 18 where each negative portion of the power wave is presented with a high impedance and inhibited substantially from passing through to the coil 16. The crystal diode however, is not a perfect rectifier, and, as such, a small amount of reverse current does flow through the coil 12. For the following explanation only it shall be assumed that the crystal diode is perfect, and all negative potentials are blocked. The voltage wave that appears at the output of the crystal diode 18 is shown graphically by the curve B of Fig. 4. It shall now be assumed that the core is initially at the positive remanence condition represented by the numeral 30 of Fig. 3. A positive potential power pulse is applied to the terminal 20 during the time interval *t0–t1* and passes through the diode 18 and the relatively low impedance power coil 12 to the output terminal 24. Thus, the power pulse appears at the output terminal 24 during the time interval *t0–t1* as represented by curve D of Fig. 4.

As the power pulse returns to zero potential, indicated by curve A of Fig. 4 at the time *t1*, the core returns to the operating point represented by the numeral 30, Fig. 3, and remains at this point until the arrival of the next positive going power pulse, as indicated by curve A, at the time *t2*; at which time the core is again driven to saturation, and an output signal again appears at the output terminal 24. Thus, with a perfect crystal diode, and in the absence of any control signal or resetting signal, an output pulse will appear at the output terminal 24 at each instant that a positive going power pulse appears at the power input terminal 20. If, however, a positive going pulse is applied to the input terminals of the control winding 14 when the power pulse is negative, and the coils are oriented as shown, wherein the control winding 12 is wound opposite in direction to the power coil 14; when the positive going control signal represented by curve C of Fig. 4 during the time *t3–t4* will drive the magnetic core in a negative direction towards numeral 36 of Fig. 3. Then, as the control signal returns to zero potential at the time *t4*, the core will be, magnetically, at the point represented by the numeral 32. The next appearing positive potential of the power pulse occurs during the time interval *t4–t5* and is presented with a relatively high impedance. Under these conditions a substantial portion of the energy of the power pulse is utilized in driving the magnetic core to the region represented by the numeral 34 and an output signal is not produced. Therefore, the application of a control signal to the control winding 14 during that time interval when the power signal is negative will prevent the generation of a signal at the output terminal.

At time *t5*, or immediately after inhibiting the output signal, the core is magnetically at the point represented by the numeral 30 and, if another control signal is not applied to the control winding 14, the next appearing positive pulse of the power signal that appears during the time *t6–t7* will drive the magnetic core to saturation and a signal will appear at the output terminal 24.

Figure 2:
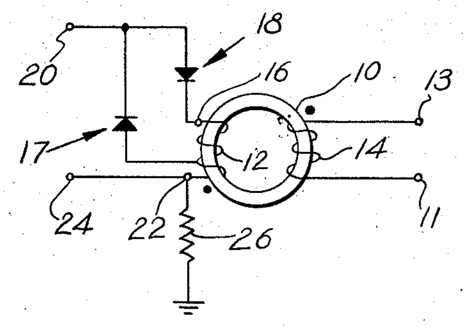

In some circuit arrangements it is desirable to obtain an output signal that is in coincidence with the occurence of the first appearing positive pulse of the power signal that appears immediately after the occurrence of the control signal. This can be accomplished by connecting a second crystal diode 17, as shown in Fig. 2, and reversing the control winding 14 so that the power winding 12 and the control winding 14 are wound in the same direction. One end of the crystal diode 17 is coupled to the power input terminal 20, and its other end to a relatively small number of turns of the power winding 12. This arrangement allows a negative signal having a predetermined amplitude to pass through a portion of the power coil to drive the core to that region of the curve of Fig. 3 represented by the numeral 36. If there is no control signal present, the next appearing positive portion of the power signal will be used to drive the magnetic core to that region of the curve represented by the numeral 34, and there will not be any output signal. If, however, a control signal is fed to the control winding 14 when the power signal appearing at the input terminal 20 is negative, then the control signal will override the resetting effect of the negative portion of the power wave to bias or drive the magnetic core to the positive portion of the hysteresis curve represented by the numeral 34, and a signal will appear at the output terminal 24 during the occurrence of the next positive pulse signal of the power wave. If a control signal is not fed to the control winding during the occurrence of the next appearing negative portion of the power wave, then the core will be driven into the negative remanence region represented by the numeral 36, and the next appearing positive pulse of the power wave will be expended in driving the core to the positive remanence region 34 and no signal will appear at the output terminal.

The above discussion assumed that the crystal diode utilized was perfect; that is, that there was no leakage or feedback current flowing through the crystal diode when the power pulses were negative. The crystal diode utilized in the circuit described, allowed only the positive portion of the power wave to pass through to the power winding; the negative portion was blocked completely. In practice, however, every crystal diode permits a small amount of negative or leakage current to flow. The magnitude of the flow of leakage current is a distinctive characteristic of each crystal diode, it being unpredictable and will vary with each crystal diode.

However, referring to Fig. 1, with a perfect crystal diode it becomes obvious that the magnetization of the core cannot go any lower than that value as determined by the magnitude of the current in the control winding.

Figure 5:
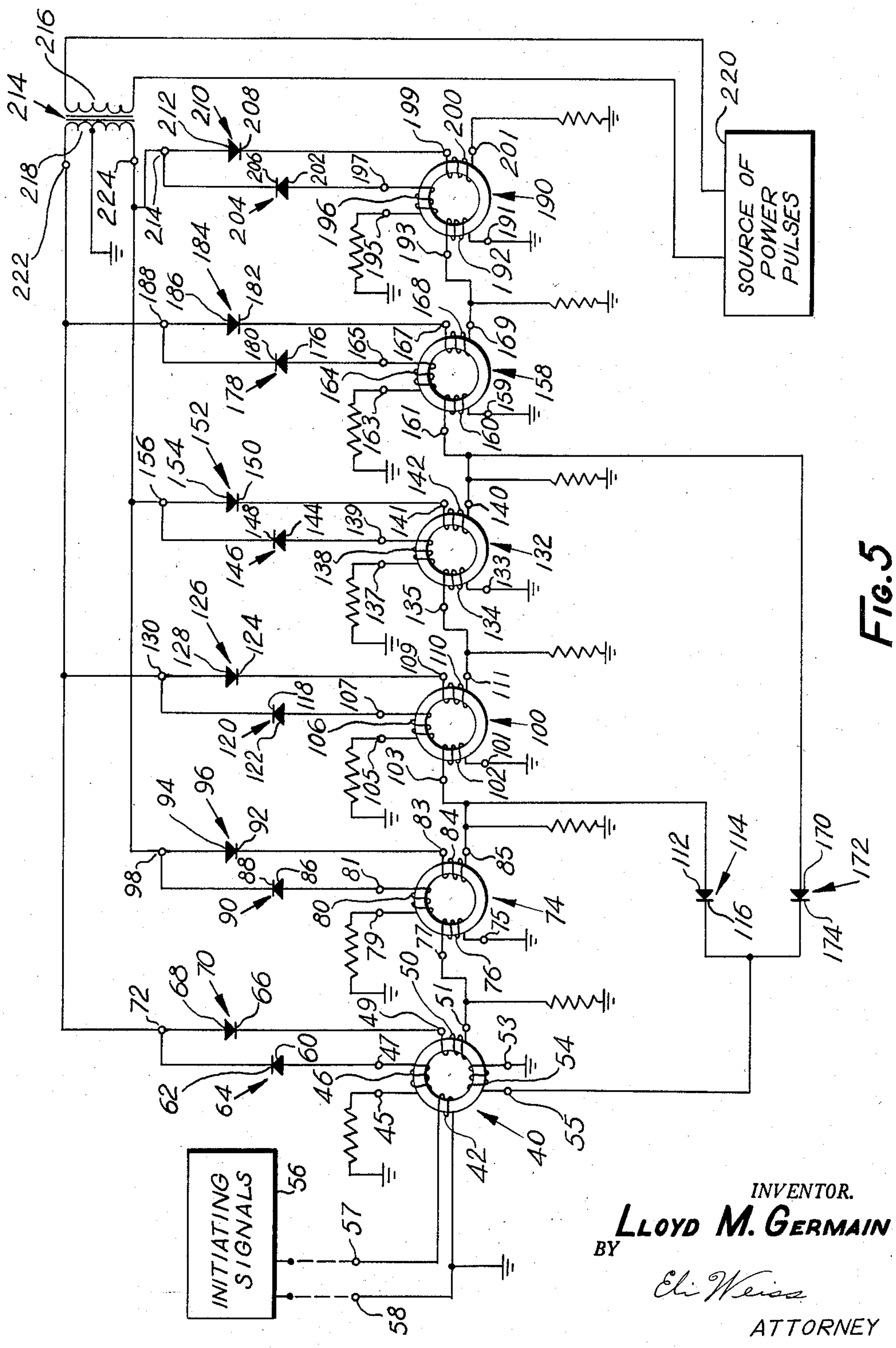
Fig. 5 is a schematic of the present invention wherein an output pulse is generated each one-half cycle for a duration of three cycles.

Referring to Fig. 5, therein is disclosed a schematic diagram of this invention wherein a plurality of magnetic amplifiers are coupled together in series. The first magnetic amplifier is fed from a source of initiating signals. The output terminal of every other (or second) magnetic amplifier is coupled to feed negative feedback signals to a feedback winding supported by the first magnetic amplifier. In this manner only the first appearing pulse is allowed to pass through the first magnetic amplifier. All subsequent appearing signals are inhibited until the initial input signal has traveled through the last of the series of magnetic amplifiers. At that instant, another pulse is allowed to pass through the first appearing magnetic amplifier and the cycle is repeated. Thus, only one pulse at a time is stepped through the device, and subsequent pulses cannot enter the device until the first or preceding pulse has emerged from the output terminal of the last magnetic amplifier of the series.

The first magnetic amplifier 40 supports an input winding 42, a bias winding 46 having terminals 45 and 47, a power winding 50 having terminals 49 and 51, and a feedback winding 54 having terminals 53 and 55. A source of initiating signals 56 is coupled to feed the input winding 42 through the terminals 57 and 58. The terminal 58 is coupled to a ground terminal. Referring to the bias winding 46, the terminal 45 is coupled to a ground terminal through an impedance, and the terminal 47 is coupled to the anode 60 of a crystal diode 64. The terminal 49 of the power winding 50 is coupled to the cathode 66 of a crystal diode 70. The cathode 62 and the anode 68 of the crystal diodes 64 and 70 respectively are coupled together at a terminal point 72.

A second magnetic amplifier assemblage 74 supports an input winding 76 having terminals 75 and 77, a bias winding 80 having terminals 79 and 81, and a power winding 84 having terminals 83 and 85. The terminal 51 of the power winding 50 is coupled to a ground terminal through a load impedance and to the terminal 77 of the input winding 76. The terminal 75 is coupled to a ground terminal. The terminal 79 of the bias winding 80 is coupled to a ground terminal through an impedance, and the terminal 81 is coupled to the anode 86, of a crystal diode 90. The terminal 83 of the power winding 84 is coupled to a cathode 92 of a crystal diode 96. The cathode 88 and the anode 94 of the crystal diodes 90 and 96 respectively are coupled to a common terminal 98.

A third magnetic amplifier 100 supports an input winding 102 having terminals 101 and 103, a bias winding 106 having terminals 105 and 107, and a power winding 110 having terminals 109 and 111. The terminal 85 of the power winding 84 is coupled to a ground terminal through a load impedance, to the terminal 103 of the input winding 102, and to the anode 112 of the crystal diode 114. The cathode 116 of the crystal diode is coupled to the input terminal 55 of the feedback winding 54. The terminal 105 of the bias winding 106 is connected to a ground terminal through an impedance, and the terminal 107 is coupled to the anode 118 of the crystal diode 120. The terminal 109 of the power winding 110 is connected to the cathode 124 of the crystal diode 126. The cathode 122 and the anode 128 of the crystal diodes 120 and 126 respectively are coupled to a common terminal 130.

A fourth magnetic amplifier 132 supports an input winding 134 having the terminals 133 and 135, a bias winding 138 having the terminals 137 and 139, and a power winding 142 having the terminals 141 and 143. The terminal 111 of the power winding 110 is coupled to a ground terminal through a load impedance and to the input terminal 135 of the input winding 134. The terminal 133 is coupled to a ground terminal. The bias winding 138 is coupled to a ground terminal through an impedance by means of the terminal 137, and to the anode 144 of the crystal diode 146 by the terminal 139. The terminal 141 of the power winding 142 is coupled to the cathode 150 of the crystal diode 152. The cathode 148 and the anode 154 of the crystal diodes 146 and 152 respectively are coupled to a common terminal 156.

A fifth magnetic amplifier unit 158 supports an input winding 160 having terminals 159 and 161, a bias winding 164 having terminals 163 and 165, and a power winding 168 having terminals 167 and 169. The output terminal 140 of the power coil 142 is coupled to a ground terminal through an impedance, to the input terminal 161 of the input winding 160, and to the anode 170 of the crystal diode 172. The cathode 174 of the crystal diode is coupled to the terminal 55 of the feedback winding 54.

The terminal 163 of the bias winding 164 is coupled to ground through an impedance. The terminal 165 is coupled to the anode 176 of the crystal diode 178, and the terminal 167 of the power winding 168 is coupled to the cathode 182 of the crystal diode 184. The cathode 180 and the anode 186 of the crystal diodes 178 and 184 respectively are connected to a common terminal 188.

A sixth magnetic amplifier 190 supports an input winding 192 having terminals 191 and 193, a bias winding 196 having terminals 195 and 197, and a power winding 200 having terminals 199 and 201. The output terminal 169 of the power winding 168 is coupled to a ground terminal through a load impedance, and to the input terminal 193 of the input winding 192. The terminal 191 is connected to a ground terminal. The terminal 195 of the bias winding 196 is coupled to a ground terminal through an impedance. The other terminal 197 of the bias winding 196 is coupled to the anode 202 of the crystal diode 204. The terminal 199 of the power winding 200 is coupled to the cathode 208 of the crystal diode 210. The cathode 206 and the anode 212 respectively of the crystal diodes 204 and 210 are coupled to a common terminal 214. The terminal 201 is coupled to a ground terminal through a load impedance.

A transformer 214 having a primary winding 216 and a grounded center tapped secondary winding 218 is coupled to receive a plurality of pulses from a source of power pulses 220.

The secondary winding 218 of the transformer has two terminals 222 and 224. The first terminal 222 is coupled to feed a signal to the magnetic amplifier assemblages 40, 100 and 158 through the terminals 72, 130 and 188 respectively; and the terminal 224 is coupled to feed another signal that is one hundred and eighty degrees out of phase relative to the first signal to the magnetic amplifier assemblages 74, 132 and 190 through the terminals 98, 156 and 214 respectively. The signals appearing at the output terminals of the transformer 214 are in phase relationship to the initiating signals that are fed to the input winding of the magnetic amplifier assemblage 40.

In operation, the transformer 214 converts a single phase input signal into a two phase output signal. The output signals appear across the secondary winding 218 and the common ground terminal. Thus, the signals appearing between the ground terminal and the terminals 222 and 224 respectively are one hundred and eighty degrees out of phase relative to each other. For purposes of explanation only, it shall be assumed that the signal that appears at the output terminal 222 of the transformer 214 leads the signal that appears at the output terminal 224. The first appearing or leading power pulses from the secondary of the transformer 214 are fed simultaneously to the power windings of the magnetic amplifiers 40, 100 and 158; and the last appearing of lagging power pulses from the secondary of the transformer 214 are fed simultaneously to the power windings of the magnetic amplifiers 74, 132 and 190.

The crystal diode interposed between the transformer and the power winding of each of the magnetic amplifiers allows the passage of positive potential signals only. The crystal diode interposed between the transformer and each bias winding of each of the magnetic amplifiers allows the passage of signals only when the power windings are not conducting. The bias windings are of sufficient size to drive their associated magnetic cores into the negative portion of the B—H curve (Fig. 3) as represented by the numeral 32 when a signal is not applied to the input windings. Thus, the generation of an output signal is prevented.

If, an input signal is present at any one of the input windings of the magnetic amplifiers 40, 74, 100, 132, 158 or 190, then the negative effect of the associated bias windings will have an insignificant effect and an output signal will be produced when a power pulse is fed to the power winding. All of the indicated magnetic amplifier assemblages of this disclosed device are similar except for the first magnetic amplifier assemblage 40. This amplifier contains, in addition to the standard input winding, bias winding, and power winding, a feedback winding. The feedback winding is fed from the output terminals of the magnetic amplifier assemblages 74 and 132 through crystal diodes such that positive potential signals only can be fed to the feedback winding. Referring to the magnetic amplifier assemblage 40, when the feedback winding is energized it complements the effect of the bias winding and drives the magnetic core into the negative saturation area to prevent the setting of the magnetic core by the input winding. The input winding, however, is powerful enough to override the effect of the bias winding only, it cannot override the combined effect of the feedback winding and the bias winding. Therefore, if a signal is present at the input winding and at the bias winding, an output signal will be produced. In the magnetic amplifiers 74, 100, 132, 158 and 190, the effect of the input windings are designed to override the effect of the bias windings to set the magnetic cores.

Initially, with no information in the device, a signal from the source of initiating signals 58 is fed to the input winding 42 of the magnetic amplifier 40. This signal sets the first core. At the occurrence of the first appearing leading power pulse, an output appears at the terminal 51 and is fed to the input winding 76 of the magnetic amplifier 74. This signal overrides the effect of the bias winding 80 to set the second core. At the occurrence of the next appearing power pulse a signal appears at the output terminal 85. This signal is fed to the input winding 102 of the magnetic amplifier assemblage 100, and is also fed through the crystal diode 114 to the feedback winding 54 of the magnetic amplifier assemblage 40. The output signal of the magnetic amplifier assemblage 74 has two effects, first it sets the core of the magnetic amplifier assemblage 100 to enable the generation of an output signal at the terminal 111 of the amplifier 100, and second, it drives the core of the magnetic amplifier 40 into the negative region 32 of the curve of Figure 2 to prevent the occurrence of an output signal at the terminal 51. Thus it can readily be seen that as the initial input pulse is advanced from one magnetic amplifier to the next, all subsequent input signals from the source of initiating signals are inhibited. The negative feedback signal prevents all subsequent input pulses from entering the divider by balancing out the input voltage and resetting the input core until the initially entered input signal appears at the output terminal 201 of the last magnetic amplifier assemblage 110. Thus, the frequency of an input signal can be divided by any whole number depending upon the number of cores utilized and any phase of the divided input can be obtained by simply taking the desired output from earlier cores. It should be noted that each core in this device is capable of driving a load and no reshaping or amplification is necessary. It should also be noted that a desired delay of a particular pulse can be readily obtained without resorting to a relatively expensive inductance-capacitance type of delay line.

Obviously many modifications and variations of the present invention are possible in the light of the above teachings. It is, therefore, to be understood that within the scope of the appended claims the invention may be practiced otherwise than as specifically described.

What is claimed is:

1. A magnetic amplifier pulse generator comprising a first magnetic core capable of assuming a first or a second remanence state, a first input winding coupled to said first magnetic core, a source of initiating signals coupled to feed said first input winding to drive the core into the first remanence state, a first power winding coupled to said first magnetic core to pass a signal when the core is in the first remanence state, a second magnetic core capable of assuming a first or a second remanence state, a second input winding coupled to said second magnetic core and fed by said first power winding to drive said second magnetic core into the first remanence state, a second power winding coupled to said second magnetic core to pass a signal when the second magnetic core is in the first remanence state, first means coupling said first magnetic core to said second power winding to inhibit the passing of signals from said source of initiating signals by said first magnetic core when said second magnetic core is in the first remanence state, a source of power pulses, and second means interposed between said source of power pulses and said first and second power windings to feed pulse signals sequentially to said first and second power windings.

2. The combination of claim 1 wherein said first means comprises a feedback circuit.

3. The combination of claim 1 wherein said first means comprises a feedback winding coupled in series to a rectifying means.

4. The combination of claim 3 wherein said rectifying means comprises a crystal diode.

5. The combination of claim 1 wherein said second means comprises a phase splitting device.

6. The combination of claim 1 wherein said second means comprises a transformer.

7. The combination of claim 1 wherein said second means comprises a primary winding, and a grounded center tapped secondary winding coupled to said primary winding.

8. A magnetic amplifier pulse generator comprising a first magnetic core capable of assuming a positive or a negative remanence state, a first input winding coupled to said first magnetic core, a source of initiating signals coupled to feed said first input winding to drive the magnetic core into the positive remanence state, a first power winding coupled to said first magnetic core to pass a signal when the core is in the positive remanence state, a second magnetic core capable of assuming a positive or a negative remanence state, a second input winding coupled to said second magnetic core and fed by said first power winding to drive said second magnetic core into the positive remanence state, a second power winding coupled to said second magnetic core to pass a signal when the second magnetic core is in the positive remanence state, a source of power pulses, and phase splitting means interposed between said source of power pulses and said first and second power windings to feed signals sequentially to said power windings.

9. The combination of claim 8 wherein said phase splitting means comprises a transformer.

10. The combination of claim 8 wherein said phase splitting means comprises a transformer having a tapped secondary.

11. The combination of claim 8 wherein said phase splitting means comprises a primary winding and a grounded center tapped secondary winding coupled to said primary winding.

12. A magnetic amplifier pulse generator comprising a first magnetic core capable of assuming a positive or a negative remanence state, a first input winding coupled to said first magnetic core, a source of initiating signals coupled to feed said first input winding to drive the core into the positive remanence state, a feedback winding coupled to said first magnetic core, a first power winding coupled to said first magnetic core to pass a signal when the core is in the positive remanence state, a second magnetic core capable of assuming a positive or a negative remanence state, a second input winding coupled to said second magnetic core and fed by said first power winding to drive said second magnetic core into the positive remanence state, a second power winding coupled to said second magnetic core to pass a signal when the second magnetic core is in the positive remanence state, first means coupling said first magnetic core to said second power winding to inhibit the passing of signals from said source of initiating signals by said first magnetic core when said second magnetic core is in a positive remanence state, a third magnetic core capable of assuming a positive or a negative remanence state, a third input winding coupled to said third magnetic core and fed by said second power winding to drive said third magnetic core into the positive remanence state, a third power winding coupled to said third magnetic core to pass a signal when said third magnetic core is in the positive remanence state, a fourth magnetic core capable of assuming a positive or a negative remanence state, a fourth input winding coupled to said fourth magnetic core and fed by said third power winding to drive said fourth magnetic core into the positive remanence state, a fourth power winding coupled to said fourth magnetic core to pass a signal when said fourth magnetic core is in the positive remanence state, a source of power pulses and second means interposed between said source of power pulses and said power windings to feed power pulses sequentially to adjacent power windings and simultaneously to alternate power windings.

13. The combination of claim 12 wherein said first means comprises a feedback winding and a rectifying means.

14. The combination of claim 12 wherein said second means comprises a transformer.

15. The combination of claim 12 wherein said second means comprises a primary winding, and a center tapped secondary winding coupled to said primary winding.

16. In a magnetic amplifier pulse generator, a magnetic amplifier comprising a magnetic core capable of assuming a first or a second remanence state, a first source of signals, a power winding coupled to said magnetic core and fed by said first source of signals, a bias winding coupled to said magnetic core and fed by said first source of signals to drive said magnetic core to said first remanence state to block the passage of signals through said power winding, a feedback winding which complements said bias winding coupled to said magnetic core, means to selectively energize said feedback winding, a second source of signals, and an input winding coupled to said magnetic core and fed by said second source of signals to drive said magnetic core to said second remanence state to nullify the effect of said bias winding and permit the passage of signals through said power winding only when said feedback winding is not energized.

17. In a magnetic amplifier pulse generator, a magnetic amplifier comprising a magnetic core capable of assuming a first or a second remanence state, a first source of signals having a first polarity and a second polarity, a power winding coupled to said magnetic core, first polarity sensitive means interposed between said source of signals and said power winding to pass signals having said first polarity only, a bias winding coupled to said magnetic core, second polarity sensitive means interposed between said source of signals and said bias winding to pass signals having said second polarity only to drive said magnetic core to said first remanence state to block the passage of signals through said power winding, a feedback winding that complements said bias winding coupled to said magnetic core, a second source of signals selectively energized by said power winding coupled to energize said feedback winding to prevent the passage of signals through said first power winding by neutralizing the effect of said input winding.

18. In a magnetic amplifier pulse generator, a magnetic amplifier comprising a first magnetic core capable of assuming a first or a second remanence state, a first source of signals, a first power winding coupled to said first magnetic core and fed by said first source of signals, a first bias winding coupled to said first magnetic core and fed by said first source of signals to drive said first magnetic core to said first remanence state to block the passage of signals through said first power winding, a feedback winding which complements said bias winding coupled to said first magnetic core, a second source of signals, a first input winding coupled to said first magnetic core and fed by said second source of signals to drive said first magnetic core to said second remanence state to nullify the effect of said bias winding and permit the passage of signals through said power winding, a second magnetic core capable of assuming a first or a second remanence state, a second power winding coupled to said second magnetic core and fed by said first source of signals, a second bias winding coupled to said second magnetic core and fed by said first source of signals to drive said second magnetic core to said first remanence state to block the passage of signals through said second power winding, a second input winding coupled to said second magnetic core and fed by said first power winding to drive said second magnetic core to said second remanence state to nullify the effect of said second bias winding to permit the passage of signals through said second power winding, and coupling means to feed a signal from said second power winding to said feedback winding to prevent the passage of a signal through said first power winding by complementing the effect of said first bias winding to neutralize the effect of said first input winding.

References Cited in the file of this patent

UNITED STATES PATENTS

| | | |
|---|---|---|
| 2,729,754 | Steagall | Jan. 3, 1956 |
| 2,729,755 | Steagall | Jan. 3, 1956 |